(12) United States Patent
Kurono et al.

(10) Patent No.: US 12,463,489 B2
(45) Date of Patent: Nov. 4, 2025

(54) STATOR WITH MOLDED POWER LINE CONNECTION

(71) Applicants: TOYOTA JIDOSHA KABUSHIKI KAISHA, Toyota (JP); J.S.T. Mfg. Co., Ltd., Tokyo (JP); MATSUO INDUSTRIES, INC., Nagoya (JP)

(72) Inventors: Yosuke Kurono, Nissin (JP); Tsuyoshi Matsuo, Nisshin (JP); Naoya Takeshita, Miyoshi (JP); Syunpei Kuno, Toyoake (JP)

(73) Assignees: TOYOTA JIDOSHA KABUSHIKI KAISHA, Toyota (JP); J.S.T. Mfg. Co., Ltd., Tokyo (JP); MATSUO INDUSTRIES, INC., Nagoya (JP)

( * ) Notice: Subject to any disclaimer, the term of this patent is extended or adjusted under 35 U.S.C. 154(b) by 230 days.

(21) Appl. No.: 18/212,534

(22) Filed: Jun. 21, 2023

(65) Prior Publication Data
US 2024/0039356 A1   Feb. 1, 2024

(30) Foreign Application Priority Data
Jul. 27, 2022   (JP) .................. 2022-119300

(51) Int. Cl.
*H02K 3/50* (2006.01)
*H02K 1/16* (2006.01)

(52) U.S. Cl.
CPC .............. *H02K 3/50* (2013.01); *H02K 1/165* (2013.01)

(58) Field of Classification Search
CPC ...... H02K 3/50; H02K 1/165; H02K 2203/09; H02K 5/225; H02K 1/14; H02K 3/28; H02K 3/46; H02K 15/022

USPC ........................................... 310/179
See application file for complete search history.

(56) References Cited

U.S. PATENT DOCUMENTS

| | | | | |
|---|---|---|---|---|
| 2002/0175574 A1* | 11/2002 | Okazaki | ................ | H02K 3/50 310/68 B |
| 2008/0129132 A1* | 6/2008 | Gwon | ................ | H02K 3/50 310/71 |
| 2009/0102312 A1* | 4/2009 | Tsukashima | ........... | H02K 3/522 310/215 |

(Continued)

FOREIGN PATENT DOCUMENTS

| | | |
|---|---|---|
| JP | 2010-081742 A | 4/2010 |
| JP | 2017-127132 A | 7/2017 |

(Continued)

*Primary Examiner* — Ahmed Elnakib
(74) *Attorney, Agent, or Firm* — Sughrue Mion, PLLC

(57) ABSTRACT

A stator includes a core having a yoke having an annular shape, and teeth protruding toward a center of the yoke and provided at predetermined intervals in a circumferential direction of the yoke, a coil disposed to surround the teeth, a power line connected to a coil end portion of the coil, protruding in an axial direction of the core, and having one end and the other end, the power line having a terminal portion connected to the other end opposite to the one end connected to the coil end portion, a bent portion bent to extend in a predetermined direction, and a coating portion coating the bent portion over both ends of the bent portion, and a mold portion surrounding the coil end portion and integrally surrounding the coil end portion, the one end of the power line, and at least part of the coating portion.

3 Claims, 2 Drawing Sheets

(56) References Cited

U.S. PATENT DOCUMENTS

| | | | | |
|---|---|---|---|---|
| 2012/0056500 A1* | 3/2012 | Nakanishi | ............ | H02K 15/35 |
| | | | | 310/71 |
| 2016/0190891 A1* | 6/2016 | Masugi | ................ | H02K 15/12 |
| | | | | 310/201 |
| 2016/0336829 A1* | 11/2016 | Haruno | ................ | H02K 5/225 |
| 2018/0083516 A1* | 3/2018 | Endo | .................... | H02K 5/128 |
| 2019/0097484 A1* | 3/2019 | Kaneshige | ............ | H02K 15/33 |
| 2024/0039356 A1* | 2/2024 | Kurono | ................ | H02K 5/225 |

FOREIGN PATENT DOCUMENTS

| | | | | |
|---|---|---|---|---|
| JP | 2019-068494 A | 4/2019 | | |
| JP | 2019-161716 A | 9/2019 | | |
| WO | WO-2016067530 A1 * | 5/2016 | ............ | F04D 25/08 |

\* cited by examiner

STATOR WITH MOLDED POWER LINE CONNECTION

CROSS-REFERENCE TO RELATED APPLICATION

This application claims priority to Japanese Patent Application No. 2022-119300 filed on Jul. 27, 2022, incorporated herein by reference in its entirety.

BACKGROUND

1. Technical Field

The disclosure relates to a stator configured such that a power line is connected to a coil end portion protruding in an axial direction of a stator core.

2. Description of Related Art

Japanese Unexamined Patent Application Publication No. 2019-068494 (JP 2019-068494 A) describes a stator in which one end of each power line is welded to a coil end portion protruding in an axial direction from a stator core and the welded joint and the coil end portion are fixed to each other by a resin mold. A terminal connected to an external electrical circuit, such as an inverter, is coupled to the other end of each power line.

Japanese Unexamined Patent Application Publication No. 2019-161716 (JP 2019-161716 A) describes a stator in which a coil end portion and one end of each power line are integrally fixed to each other by a resin mold and the coil end portion and each power line are electrically connected to each other by a lead provided in the resin mold or outside the resin mold.

Japanese Unexamined Patent Application Publication No. 2017-127132 (JP 2017-127132 A) describes an electric motor. In the electric motor, a stator and an arcuate retainer provided at one-side end of the stator in an axial direction of the stator are fixed to a case, with the result that a central part of the retainer in a perimeter direction of the retainer is elastically deformed and fixed so as to press the stator in the axial direction. In the electric motor, leads are extended from a region where the retainer is provided, and the leads are molded together with associated coils.

Japanese Unexamined Patent Application Publication No. 2010-081742 (JP 2010-081742 A) describes a fixing structure for a temperature sensor wire with a three-layer structure made up of an electric line, a heat-shrinkable tube, and a protective tube.

SUMMARY

As in the case of the stators respectively described in JP 2019-068494 A, JP 2019-161716 A, and JP 2017-127132 A, when the coil end portion and the end of each of the power lines are integrally fixed by the resin mold, the power lines are stably fixed. On the other hand, for a stator of an alternating-current motor or the like, which connects a plurality of power lines to a coil end portion, a terminal provided at one side of each of the power lines is fixed to a terminal block for connection with a power supply. Therefore, normally, at least part of a portion between the end connected to the coil end portion and the end provided with the terminal is bent so as to extend in a predetermined direction. For the power line of which one end is fixed to the coil end portion, the other end is fixed to the terminal block, and that has a bent portion at a predetermined location, even when a joint between the coil end portion and the power line is fixed by a resin mold, a load (stress) is applied to the bent portion due to vibrations of the stator. Thus, the durability of the power line may decrease.

The disclosure provides a stator that improves the durability of a power line.

An aspect of the disclosure relates to a stator. The stator includes a core, a coil, a power line, and a mold portion. The core has a yoke having an annular shape, and teeth protruding toward a center of the yoke and provided at predetermined intervals in a circumferential direction of the yoke. The coil is disposed so as to surround the teeth. The power line is connected to a coil end portion of the coil, protruding in an axial direction of the core. The power line has one end and the other end. The power line has a terminal portion connected to the other end opposite to the one end connected to the coil end portion, a bent portion bent so as to extend in a predetermined direction, and a coating portion coating the bent portion over both ends of the bent portion. The mold portion surrounds the coil end portion. The mold portion surrounds the coil end portion, the one end of the power line, and at least part of the coating portion together.

In the above aspect, the coating portion may be provided by insert molding with the bent portion and the one end.

In the above aspect, the coating portion may include at least one of a heat-shrinkable tube and a heat-seal tube, coating the bent portion and the one end.

In the above aspect, the power line may have a plurality of the bent portions between the one end and the other end, and the coating portion may include one of the plurality of bent portions, closest to the one end.

According to the above aspect, the power line connected to the coil has the bent portion bent so as to extend in the predetermined direction, and the bent portion is coated with the coating portion over both ends of the bend portion. Therefore, the stiffness is improved by increasing a geometrical moment of inertia of the bent portion. An eigenvalue of the power line improves owing to the coating portion, so the amplitude of the power line during vibration is reduced. Therefore, the durability of the power line is improved. In addition, according to the aspect of the disclosure, the coil end portion, the one end of the power line connected to the coil end portion, and at least part of the coating portion are surrounded by the mold portion together. Therefore, since the coating portion is held by the mold portion, the vibration of the bent portion is reduced, so the durability of the power line is further improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the disclosure will be described with reference to the accompanying drawings. The embodiment described below is only a specific example embodiment of the disclosure and does not limit the disclosure.

Figure 1:
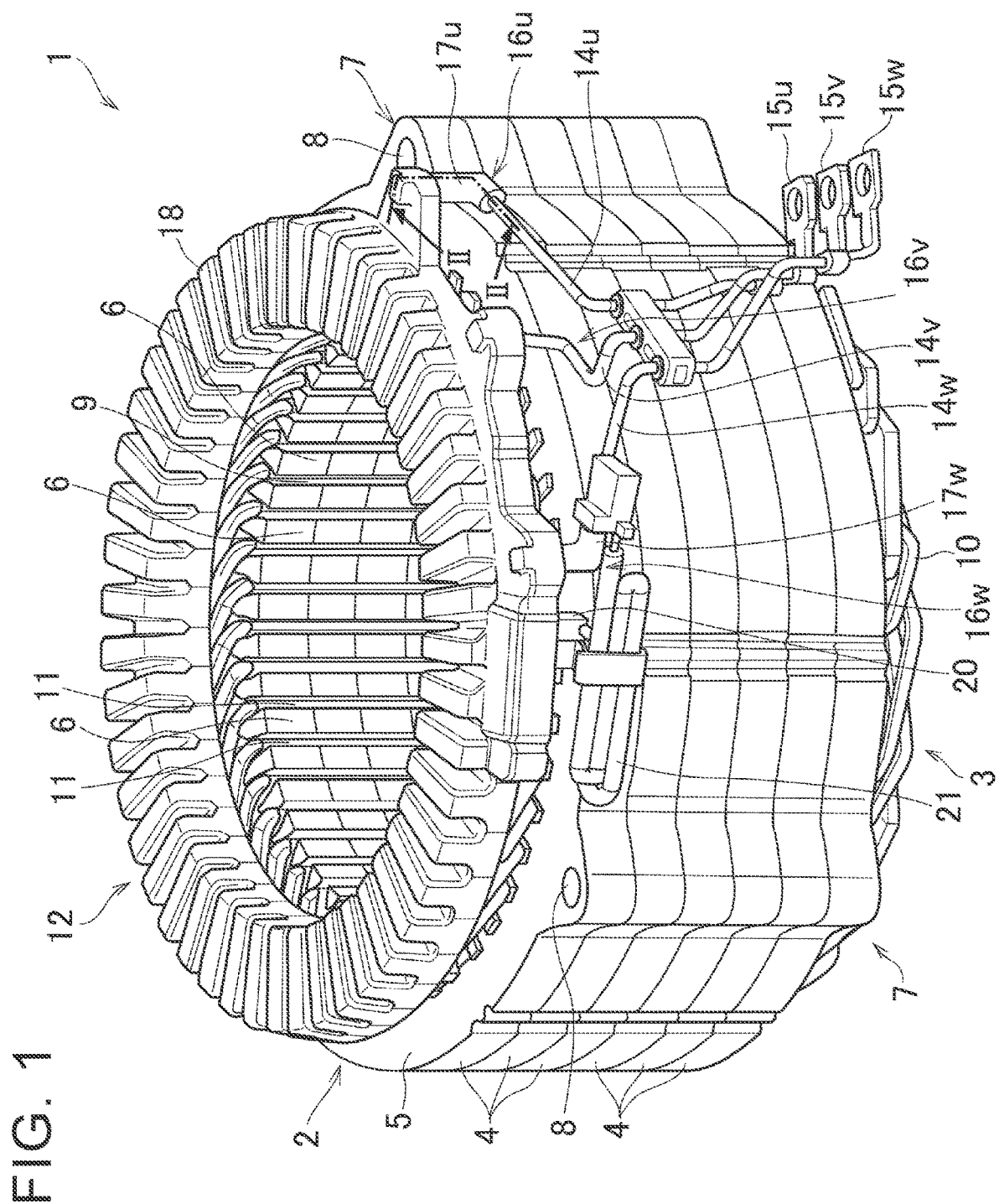
FIG. 1 is a perspective view that illustrates an example of a stator according to an embodiment of the disclosure.

FIG. 1 is a perspective view for illustrating an example of a stator according to the embodiment of the disclosure. A stator 1 shown in FIG. 1 is a stator used in a three-phase alternating-current motor. The stator 1 as well as an existing stator includes a stator core 2 and coils 3 mounted on the stator core 2.

The stator core 2 is made up of a plurality of steel sheets 4 stacked on top of one another. Each of the steel sheets 4 has a yoke 5 having an annular shape, and a plurality of teeth 6 protruding toward the center of the yoke 5. Mounting portions 7 are provided on the outer periphery of the yoke 5 so as to protrude radially outward. The mounting portions 7 are used to fix the stator core 2 to a case (not shown) and bind the steel sheets 4 stacked. In the example shown in FIG. 1, the mounting portions 7 are provided at predetermined intervals in the circumferential direction of the yokes 5. Each of the mounting portions 7 has a through-hole 8 in which a bolt (not shown) for fixing the stator core 2 to the case is inserted. In other words, when the stator core 2 is mounted on the case, the yokes 5 are bound in the axial direction.

The teeth 6 are provided at predetermined intervals in the circumferential direction of the yokes 5. In other words, a gap (slot) 9 is provided between any adjacent two of the teeth 6 in the circumferential direction of the yokes 5. In other words, when the phases (positions in the rotation direction) of the mounting portions 7 are matched, the phases of the teeth 6 of the steel sheets 4 are also at the same positions. Therefore, when the steel sheets 4 are aligned and assembled, the slots 9 extend through in the axial direction of the stator core 2.

The coils 3 shown in FIG. 1 are made up of flat wires 10 made of a copper material and having a rectangular cross section. Specifically, the flat wires 10 having a U-shape are arranged in the radial direction of the stator core 2. The flat wires 10 are assembled to the teeth 6 from one side (lower side in FIG. 1) in the axial direction of the stator core 2 such that long-axis portions 11 opposite to each other in each of the flat wires 10 are inserted in the associated slots 9. Then, portions protruding toward the other side in the axial direction of the stator core 2 are welded. Thus, the flat wires 10 make up a serial conductor.

More specifically, one of two ends of a predetermined one of the flat wires 10, protruding in the axial direction of the stator core 2, is bent so as to contact with one end of another one of the flat wires 10 and welded to each other. The other one of the two ends of the predetermined one of the flat wires 10 is bent so as to contact with one end of another one of the flat wires 10 and welded to each other. Thus, the coil 3 is formed. In this way, the coil 3 is configured so as to surround the teeth 6 by welding the flat wires 10 into a serial conductor. The coil 3 configured in this way has portions protruding toward both sides in the axial direction of the stator core 2, and, in the following description, each of the protruded portions is referred to as a coil end portion 12.

The stator 1 shown in FIG. 1 is a stator used in a three-phase alternating-current motor in which the coils 3 corresponding to three U-phase, V-phase, and W-phase segments are disposed alternately in the circumferential direction of the stator core 2. Therefore, the flat wires 10 that make up the same segment are connected in series with each other astride the coils 3 that respectively make up the other two segments by means of crossing lines (or busbars) (not shown) or the like. One ends of the coils 3 that respectively make up the segments are electrically connected to one another at a neutral point (not shown). The other ends of the coils 3 that respectively make up the segments are extended outward from the coil end portion 12 in the radial direction of the stator core 2 to form leads 13, and power lines 14 are respectively connected to the leads 13. In other words, the stator 1 shown in FIG. 1 includes three power lines 14u, 14v, 14w.

The power lines 14u, 14v, 14w are used to connect the coils 3 with an electrical device (not shown) made up of an electrical storage device, an inverter, and the like. The power lines 14u, 14v, 14w are made of a copper material having a circular cross section. The coils 3 are respectively coupled to one ends of the power lines 14u, 14v, 14w, and terminals 15u, 15v, 15w are respectively coupled to the other ends for connection with a terminal block (not shown) of the electrical device.

In the example shown in FIG. 1, to reduce the size of the terminal block, a gap between the terminals 15u, 15v, 15w is narrower than a gap between the power lines 14u, 14v, 14w at portions respectively connected to the coils 3. Therefore, each of the power lines 14u, 14v, 14w is formed such that a portion between the end connected to the coil 3 and the end to which a corresponding one of the terminals 15u, 15v, 15w is coupled is bent by forming process. Specifically, in each of the power lines 14u, 14v, 14w respectively connected to the coils 3 of the segments, the portion connected to the coil 3 is extended in the axial direction of the stator core 2, then bent so as to extend in the circumferential direction of the stator core 2, and the distal end is further bent so as to extend in the axial direction of the stator core 2. In the following description, the portions bent so as to extend in the circumferential direction of the stator core 2 from the portions along the axial direction of the stator core 2, that is, bent portions closest to the sides to be welded to the coils 3 are referred to as bent portions 16u, 16v, 16w.

Each of the power lines 14u, 14v, 14w is formed by, for example, bending so as to extend in a predetermined direction as described above. One end is fixed to the coil 3, and the other end is fixed to the terminal block via a corresponding one of the terminals 15u, 15v, 15w. Therefore, as the electric motor vibrates, the power lines 14u, 14v, 14w vibrate due to the vibration, so a load is applied to the power lines 14u, 14v, 14w to bow the power lines 14u, 14v, 14w. Particularly, a load resulting from changes in angle between an upper-side portion and a lower-side portion of a boundary portion between an upper side and a lower side of each of the bent portions 16u, 16v, 16w, twisting of the lower-side portion with respect to the upper side portion, and the like is applied to the boundary portion, so the durability may decrease.

Therefore, the power line 14u shown in FIG. 1 improves the stiffness of the bent portion 16u by coating the bent portion 16u with a resin material to increase a geometrical moment of inertia, and the power line 14w shown in FIG. 1 improves the stiffness of the bent portion 16w by coating the bent portion 16w with a resin material to increase a geometrical moment of inertia. Specifically, a coating portion 17u is molded with a resin material across the bent portion 16u in the up and down direction, and a coating portion 17w is molded with a resin material across the bent portion 16w in the up and down direction. In the example shown in FIG. 1, in the power line 14v connected to the V-phase coil 3, a bent section is shorter than those of the other power lines 14u, 14w, so a load (or moment) that is applied to the bent portion 16v is presumably relatively small. Therefore, no coating portion is provided over the bent portion 16v in the power line 14v. In other words, the coating portion 17u is provided in the power line 14u in which the interval between the bent portion 16u and a bent portion closer to the terminal 15$u$ than the bent portion 16$u$ is greater than or equal to a predetermined interval, and the coating portion 17$w$ is provided in the power line 14$w$ in which the interval between the bent portion 16$w$ and a bent portion closer to the terminal 15$w$ than the bent portion 16$w$ is greater than or equal to the predetermined interval.

Each of the coating portions 17$u$, 17$w$ is made of a material having substantially the same coefficient of linear expansion as a resin material that is a component of an immersed resin portion 18 (described later) and having a predetermined strength. Examples of the material include polyphenylene sulfide resin (PPS) and polyphthalamide resin (PPA). Each of the coating portions 17$u$, 17$w$ is formed by insert molding. In other words, the coating portion 17$u$ is molded by inserting a predetermined range including the bent portion 16$u$ in a resin material, and the coating portion 17$w$ is molded by inserting a predetermined range including the bent portion 16$w$ in a resin material. The distal end portion of each of the power lines 14$u$, 14$w$, welded to the coil 3, is not coated with a resin material and is electrically connected to the coil 3.

The stator 1 shown in FIG. 1 includes the immersed resin portion 18 for electrically insulating the coil end portion 12 and a welded portion 19 between the coil 3 and each of the power lines 14$u$, 14$v$, 14$w$. The immersed resin portion 18 is a portion that may be regarded as a mold portion according to the embodiment of the disclosure. The immersed resin portion 18 is formed by immersing the coil end portion 12 and the welded portions 19$u$, 19$v$, 19$w$ in a predetermined resin material. The resin material has, for example, substantially the same coefficient of linear expansion as the coefficient of linear expansion of the coil 3 and may be an epoxy resin or the like that is a thermoset resin that does not melt even in the case where the temperature of the coil 3 increases.

Figure 2:
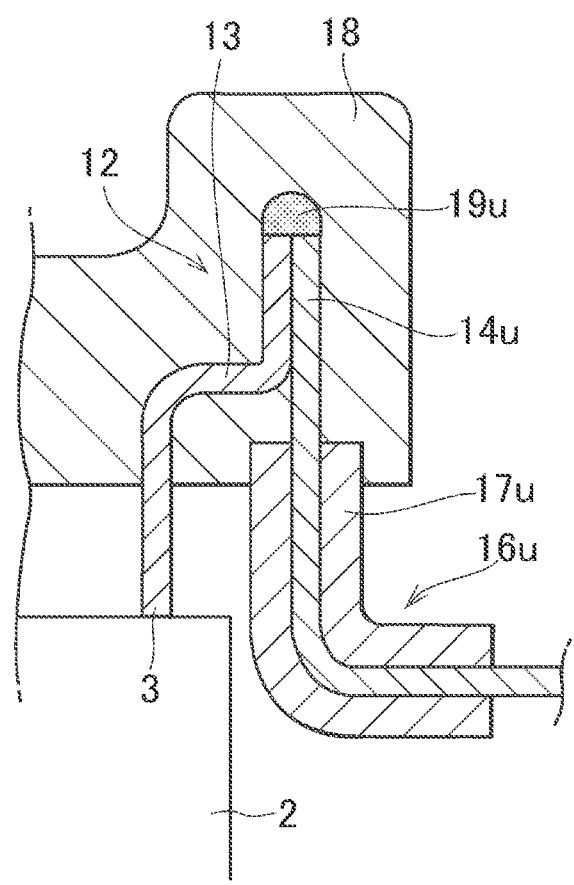
FIG. 2 is a sectional view taken along the line II-II in FIG. 1.

The immersed resin portion 18 further has a function to hold the coating portions 17$u$, 17$w$ in addition to the function to electrically insulate the coil end portion 12 and the welded portions 19$u$, 19$v$, 19$w$. FIG. 2 is a sectional view for illustrating the configuration of the immersed resin portion 18. As shown in FIG. 2, the end of the coil 3 is bent outward in the radial direction of the stator core 2, and the distal end is further bent outward in the axial direction of the stator core 2. The distal end portion having substantially the L-shape is the lead 13, and the end (that is, a non-coating portion) of the power line 14$u$ is in contact with the distal end of the lead 13.

The power line 14$u$ is formed so as to extend in the axial direction of the stator core 2 as described above, bent so as to extend in the circumferential direction at a radially outer portion of the stator core 2, and the coating portion 17$u$ is formed over both upper and lower sides of the bent portion 16$u$. The upper end (coil end portion 12 side) of the coating portion 17$u$ is inserted in the immersed resin portion 18 and integrated with the immersed resin portion 18 as shown in FIG. 2. In other words, the upper end (coil end portion 12 side) of the coating portion 17$u$ is immersed in and molded with a resin material together with the coil end portion 12, the distal end of the power line 14$u$, and the like.

In the example shown in FIG. 1, a sensor 20 for detecting the temperature of the coil end portion 12 is provided in the immersed resin portion 18, and a harness 21 for outputting a signal of the sensor 20 to an electronic control unit (not shown) is extended from the lower end of the immersed resin portion 18.

By coating the bent portions 16$u$, 16$w$ as described above, the geometrical moment of inertia of each of the bent portions 16$u$, 16$w$ is increased to improve the stiffness. An eigenvalue of the power line 14$u$ improves owing to the coating portion 17$u$, so the amplitude of the power line 14$u$ during vibration of the electric motor is reduced. An eigenvalue of the power line 14$w$ improves owing to the coating portion 17$w$, so the amplitude of the power line 14$w$ during vibration of the electric motor is reduced. In addition, the upper ends of the coating portions 17$u$, 17$w$ are held by the immersed resin portion 18, so the vibration of the bent portion 16$u$ and the vibration of the bent portion 16$w$ are reduced. As a result, a decrease in the durability of the power lines 14$u$, 14$w$ due to the vibration of the electric motor is suppressed.

Even when the power lines 14$u$, 14$w$ and the case are disposed close to each other, insulation properties are ensured since the coating portions 17$u$, 17$w$ are made from resin. In other words, it is not necessary to, for example, ensure a distance between the case and the stator core 2 in consideration of the vibration of the power line 14$u$ and the vibration of the power line 14$w$, so the size of the case is reduced.

In addition, the immersed resin portion 18 is molded in a state where each of the power lines 14$u$, 14$w$ is coated with resin and the coating portions 17$u$, 17$w$ are inserted, so the cross-sectional area of a portion protruding from the immersed resin is increased. As a result, upward warpage of the immersed resin portion 18 in FIG. 1 is reduced in the process in which the resin is cured. In other words, it is possible to reduce a change in position between each of the terminals 15$u$, 15$w$ and a corresponding one of the welded portions 19 and, by extension, to reduce variations in positional tolerance between the terminals 15$u$, 15$w$ and the terminal block. When the coil end portion 12 and the like are immersed in resin, the coating portions 17$u$, 17$w$ are fixed, so the warpage is further reduced.

The coating portions according to the embodiment of the disclosure are not limited to the ones made up of an insert-molded mold as described above, and may be, for example, a heat-shrinkable tube or a heat-seal tube that coats each of the bent portions 16$u$, 16$w$.

What is claimed is:

1. A stator comprising:
    a core having
        a yoke having an annular shape, and
        teeth protruding toward a center of the yoke and provided at predetermined intervals in a circumferential direction of the yoke;
    a coil disposed so as to surround the teeth;
    a power line connected to a coil end portion of the coil, protruding in an axial direction of the core, the power line having one end and another end, the power line having a terminal portion connected to the other end opposite to the one end connected to the coil end portion, a bent portion bent so as to extend in a predetermined direction, and a coating portion coating the bent portion over both ends of the bent portion; and
    a mold portion surrounding the coil end portion, the mold portion surrounding the coil end portion, the one end of the power line, and at least part of the coating portion together,
    wherein the coating portion includes at least one of a heat-shrinkable tube and a heat-seal tube, coating the bent portion and the one end.

2. The stator according to claim 1, wherein the coating portion is provided by insert molding with the bent portion and the one end.

3. The stator according to claim 1, wherein:
the power line has a plurality of the bent portions between the one end and the other end; and
the coating portion includes one of the plurality of bent portions, closest to the one end.

\* \* \* \* \*